United States Patent
Pacyga

(10) Patent No.: US 9,764,233 B1
(45) Date of Patent: *Sep. 19, 2017

(54) SYSTEM AND METHOD FOR OFFLINE ASYNCHRONOUS USER ACTIVITY IN A PLAYER VERSUS PLAYER ONLINE GAME

(71) Applicant: KABAM, INC., San Francisco, CA (US)

(72) Inventor: Nathan Pacyga, Lafayette, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,127

(22) Filed: Jan. 23, 2017

Related U.S. Application Data

(63) Continuation of application No. 13/754,748, filed on Jan. 30, 2013, now Pat. No. 9,569,466.

(51) Int. Cl.
| | | |
|---|---|---|
| *G06F 19/00* | (2011.01) | |
| *A63F 13/31* | (2014.01) | |
| *A63F 13/35* | (2014.01) | |
| *A63F 13/73* | (2014.01) | |
| *A63F 13/493* | (2014.01) | |

(52) U.S. Cl.
CPC .............. *A63F 13/31* (2014.09); *A63F 13/35* (2014.09); *A63F 13/493* (2014.09); *A63F 13/73* (2014.09)

(58) Field of Classification Search
CPC .................. G07F 17/30283; A63F 13/493
See application file for complete search history.

(56) References Cited

U.S. PATENT DOCUMENTS

| | | | |
|---|---|---|---|
| 7,558,884 B2 | 7/2009 | Fuller | |
| 7,577,771 B2 | 8/2009 | Steeb | |
| 8,118,678 B2 | 2/2012 | Jennings | |
| 8,128,498 B2 | 3/2012 | Aguilar, Jr. | |
| 9,569,466 B1* | 2/2017 | Pacyga | ............ G06F 17/30283 |
| 2003/0050118 A1 | 3/2003 | Suzuki | |
| 2004/0018876 A1 | 1/2004 | Kubota | |
| 2004/0087373 A1 | 5/2004 | Choi | |
| 2004/0143852 A1 | 7/2004 | Meyers | |
| 2006/0154710 A1 | 7/2006 | Serafat | |

(Continued)

FOREIGN PATENT DOCUMENTS

WO 2012103202 1/2012

*Primary Examiner* — Dmitry Suhol
*Assistant Examiner* — Alex F. R. P. Rada, II
(74) *Attorney, Agent, or Firm* — Sheppard Mullin Richter & Hampton LLP

(57) ABSTRACT

A system and method for providing offline asynchronous user activity in a player versus player online game is disclosed. A client computing platform associated with a first user may maintain a connection to the game server that hosts a game space at which an online game takes place. The client computing platform may include a game state repository that stores a game space for the game state and a game logic repository that stores game logic for the online game. When the client computing platform disconnects from the game server, an expression of the game space is maintained at the client computing platform. While disconnected, the client computing platform may receive instructions for one or more actions to be taken in the game space and may execute the actions in the online game. When a connection is established with the game server, the executed actions may be verified.

15 Claims, 2 Drawing Sheets

(56) References Cited

U.S. PATENT DOCUMENTS

| | | |
|---|---|---|
| 2007/0099703 A1 | 5/2007 | Terebilo |
| 2007/0238499 A1 | 10/2007 | Wright |
| 2008/0220854 A1 | 9/2008 | Midgley |
| 2009/0292640 A1 | 11/2009 | Heatherly |
| 2012/0009997 A1 | 1/2012 | Youm |
| 2012/0010734 A1 | 1/2012 | Youm |
| 2012/0021823 A1 | 1/2012 | Youm |
| 2012/0264509 A1 | 10/2012 | Bortnik |
| 2013/0053150 A1 | 2/2013 | Miller |
| 2013/0225287 A1 | 8/2013 | Bendayan |
| 2014/0024464 A1 | 1/2014 | Belakovsky |

* cited by examiner

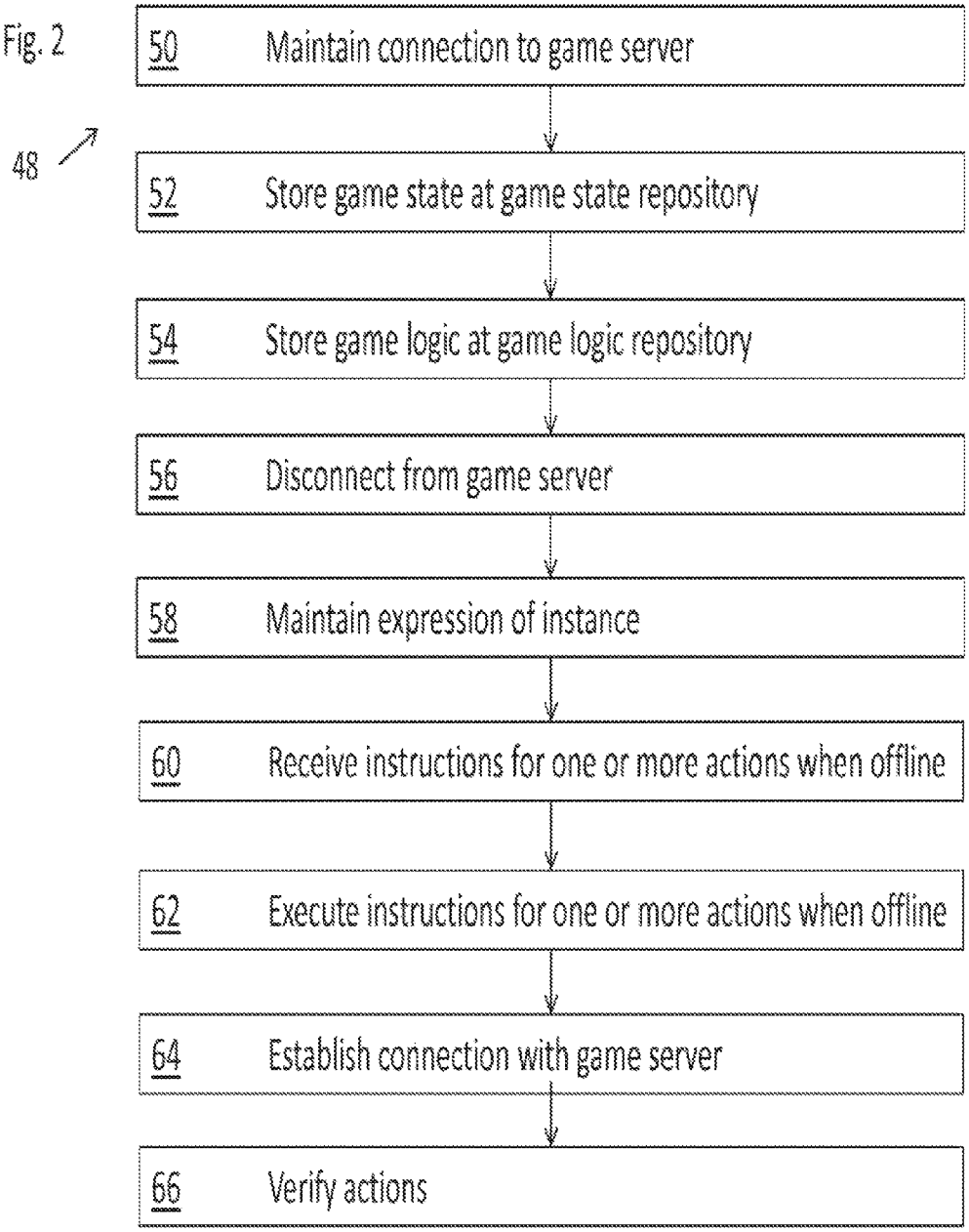

us 9,764,233 B1

SYSTEM AND METHOD FOR OFFLINE ASYNCHRONOUS USER ACTIVITY IN A PLAYER VERSUS PLAYER ONLINE GAME

FIELD

The disclosure relates to providing offline asynchronous user activity beyond the playing of a discrete game in a player versus player online game.

BACKGROUND

The ability to facilitate offline user activity in an online game is known. Known systems implement various rudimentary features to facilitate providing asynchronous game play to a user when the user is offline. Conventional systems, however, typically only facilitate offline play in single player, discrete online games. For example, conventional systems may facilitate off line asynchronous play for a user to play a game with a definitive beginning and end. Conventional systems typically fail to provide asynchronous offline play in a player-versus-player online game in which the user engages in activity beyond the playing of a discrete game. Conventional systems generally leave users of player-versus-player online games unable to engage in user activity when the user is offline.

SUMMARY

One aspect of the disclosure relates to providing offline asynchronous user activity in a player versus player online game. A game server may host a game space in which an online game takes place. A client computing platform associated with a first user may maintain a connection to the game server. A game state repository on the client computing platform may store a game state of the game space, where the game state may include information related to a first set of one or more virtual entities in the game space associated with the first user and information related to a second set of one or more virtual entities in the game space associated with a second user. A game logic repository on the client computing platform may store game logic for the online game, the game logic being based on the game state. When the client computing platform disconnects from the game server, an expression of the game space is maintained in an offline mode at the client computing platform to facilitate continued participation by the first user in the online game. While disconnected from the game server, the client computing platform may receive instructions from the first user for one or more actions to be taken by the first set of virtual entities in the game space and may execute the one or more actions in the online game such that the first set of virtual entities interact with the game space and such that an outcome of the one or more actions is dictated based on the game logic. When a connection is established with the game server, the one or more executed actions may be verified.

A system configured to provide a player versus player online game in a virtual space may include a game server that operates in a client/server architecture with one or more client computing platforms used by the users to access the virtual space. The game server may host a game space in which the online game takes place. The client computing platform may be configured to provide offline asynchronous user activity in the player versus player online game and may be associated with a first user. The client computing platform may comprise a game state repository, a game logic repository, a processor configured to execute compute program modules, and/or other components. The program modules may comprise a network module, an offline play module, a verification module, and/or other modules.

The game state repository of the client computing platform may be configured to store a game state of the game space. The game state may include information related to a first set of one or more virtual entities in the game space associated with the first user, information related to a second set of one or more virtual entities in the game space associated with a second user, and/or information related to another set of one or more virtual entities in the game space associated with another user.

The game logic repository may be configured to store game logic for the online game. In some implementations, the game logic may comprise a decision tree comprising one or more of: information relating to a plurality of actions available to the first user based on the game state, information relating to a plurality of consequences associated with the plurality of respective actions available and based on the game state, or a plurality of requirements associated with the plurality of respective actions and based on the game state.

The network module of the client computing platform may be configured to maintain a connection to a game server. The game server may host a game space in which the online game takes place. The network module may be configured to receive a game state from the game server. The network module may be configured to receive game logic from the game server. The game state and/or the game logic may be received from the game server at predetermined time intervals, where the predetermined time intervals may be set by the game, set by the user, set by administrators of the game, and/or set in other ways. The network module may be configured to communicate information from the client computing platform to the game server as well.

The offline play module may be configured to store, at the game state repository, a game state received from the game server and store, at the game logic repository, game logic received from the game server. Responsive to the client computing platform disconnecting from the game server, the offline play module may be configured to maintain an expression of the game space in an offline mode at the client computing platform to facilitate continued participation by the first user in the online game while the client computing platform is disconnected from the game server. The offline play module may be configured to receive instructions from the first user via the client computing platform for one or more actions to be taken by the first set of virtual entities in the game space. The one or more actions may cause the first set of virtual entities to interact with the game space. The offline play module may be configured to execute the one or more actions in the online game based on the received instructions such that the first set of virtual entities interact with the game space stored in the games space repository, and such that an outcome of the one or more actions is dictated based on the game logic stored in the game logic repository. When a connection is re-established with the game server, the offline play module may be configured to send the one or more actions to the game server.

In some implementations, an action may comprise a purchase of one or more virtual items, an interaction between the first set of virtual entities and the second set of virtual entities, and/or other action in the online game. An interaction between the first set of virtual entities and the second set of virtual entities may comprise one or more of: engaging in a battle with one or more of the second set of virtual entities, crossing into territory associated with one or more of the second set of virtual entities, joining an alliance with one or more of the second set of virtual entities, meeting with one or more of the second set of virtual entities, and/or other interaction between the first set of virtual entities and the second set of virtual entities.

The verification module may be configured to verify the one or more executed actions. In some implementations, the verification module may verify the one or more executed actions by sending the one or more executed actions to the game server, and receiving, from the game server, information related to a first executed action of the one or more actions. The information may comprise a request for confirmation of the first executed action, an indication that the first executed action is not valid, and/or other information related to the verification of the first executed action. In some implementations, the verification module may verify the one or more executed actions by receiving, from the game server, an updated game state. The verification module may determine whether the one or more executed actions affect the second set of one or more virtual entities. When the one or more executed actions affects the second set of one or more virtual entities, the verification module may determine whether the one or more executed actions could have occurred based on the information in the updated game state associated with the set of one or more virtual entities.

In some implementations, a method of providing offline asynchronous user activity in a player versus player online game may comprise: maintaining, by a client computing platform, a connection to a game server, the game server hosting a game space in which the online game takes place, the client computing platform being associated with a first user; storing, at a game state repository on the client computing platform, a game state of the game space, the game state including information related to a first set of one or more virtual entities in the game space associated with the first user and information related to a second set of one or more virtual entities in the game space associated with a second user; storing, at a game logic repository on the client computing platform, game logic for the online game, the game logic being based on the game state; disconnecting, by the client computing platform, from the game server; responsive to disconnecting from the game server: maintaining an expression of the game space in an offline mode at the client computing platform to facilitate continued participation by the first user in the online game while the client computing platform is disconnected from the game server; receiving instructions from the first user via the client computing platform for one or more actions to be taken by the first set of virtual entities in the game space, wherein the one or more actions cause the first set of virtual entities to interact with the second set of virtual entities; and executing the one or more actions in the online game based on the received instructions such that the first set of virtual entities interact with the second set of virtual entities, and such that an outcome of the one or more actions is dictated based on the game logic; establishing a connection, by the client computing platform, with the game server; and verifying the one or more executed actions.

In some implementations, a non-transitory electronic storage media storing information related to providing offline asynchronous user activity in a player versus player online game may comprise: a memory configured to store information related to the one or more players of an online game; a game state repository configured to store a game state of the game space, the game state including information related to a first set of one or more virtual entities in the game space associated with a first user and information related to a second set of one or more virtual entities in the game space associated with a second user; a game logic repository configured to store game logic for the online game, the game logic being based on the game state; and instructions configured to cause a client computing platform to: maintain a connection to a game server, the game server hosting a game space in which the online game takes place, the client computing platform being associated with a first user; store at the game state repository on the client computing platform, a game state of the game space; store, at a game logic repository on the client computing platform, game logic for the online game; disconnect, by the client computing platform, from the game server; responsive to disconnecting from the game server: maintain an expression of the game space in an offline mode at the client computing platform to facilitate continued participation by the first user in the online game while the client computing platform is disconnected from the game server; receive instructions from the first user via the client computing platform for one or more actions to be taken by the first set of virtual entities in the game space, wherein the one or more actions cause the first set of virtual entities to interact with the game space; and execute the one or more actions in the online game based on the received instructions such that the first set of virtual entities interact with the game space, and such that an outcome of the one or more actions is dictated based on the game logic; establish a connection, by the client computing platform, with the game server; and verify the one or more executed actions.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates an exemplary method of providing offline asynchronous user activity beyond the playing of a discrete game in a player versus player online game.

DETAILED DESCRIPTION

Figure 1:
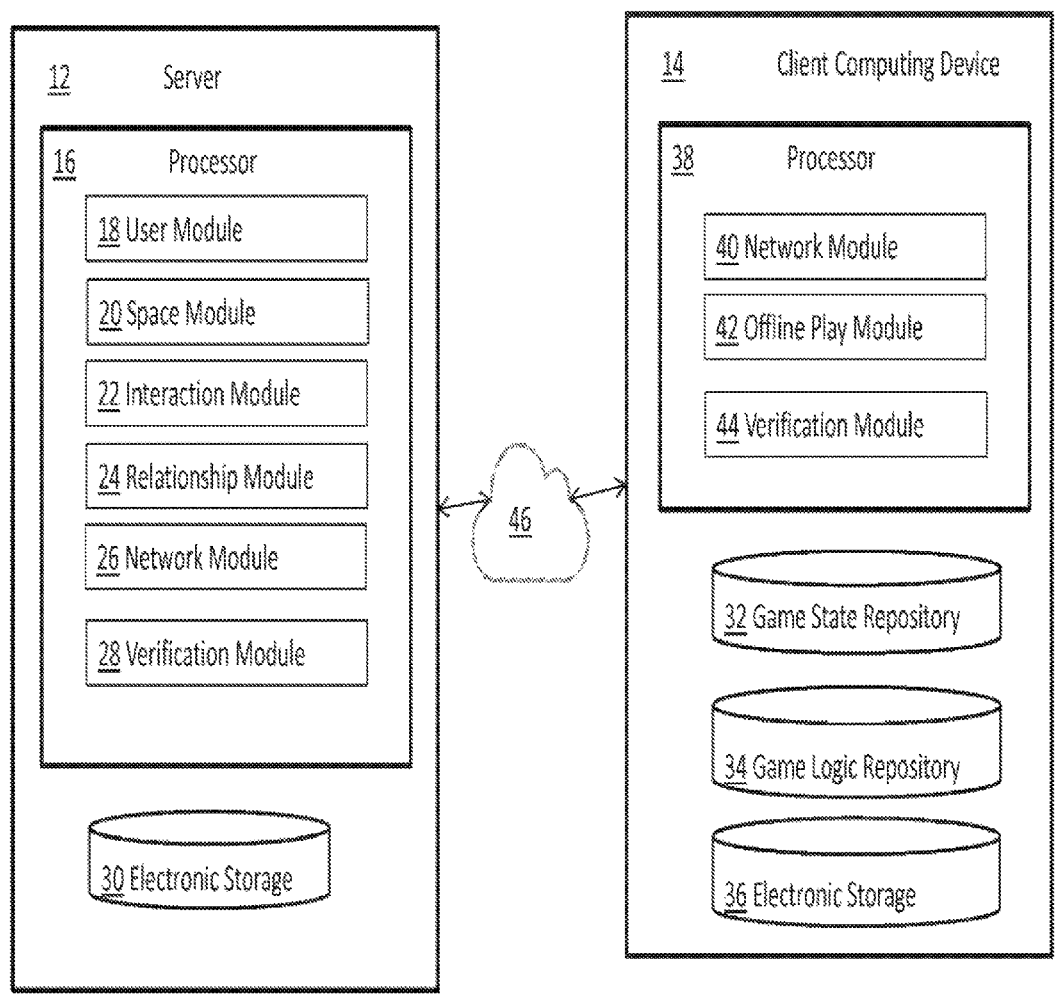
FIG. 1 illustrates an exemplary system configured to provide offline asynchronous user activity beyond the playing of a discrete game in a player versus player online game.

FIG. 1 illustrates a system 10 configured to provide offline asynchronous user activity beyond the playing of a discrete game in a player versus player online game. A game server 12 may host a game space in which an online game takes place. A client computing platform 14 associated with a first user may maintain a connection to the game server 12. A game state repository 32 on the client computing platform 14 may store a game state of the game space, where the game state may include information related to a first set of one or more virtual entities in the game space associated with the first user and information related to a second set of one or more virtual entities in the game space associated with a second user. A game logic repository 34 on the client computing platforms 14 may store game logic for the online game, the game logic being based on the game state.

When the client computing platform 14 disconnects from the game server 12, an expression of the game space may be maintained in an offline mode at the client computing platform 14 to facilitate continued participation by the first user in the online game. While disconnected from the game server 12, the client computing platform 14 may receive instructions from the first user for one or more actions to be taken by the first set of virtual entities in the game space and may execute the one or more actions in the online game, such that the first set of virtual entities interact with the game space and such that an outcome of the one or more actions is dictated based on the game logic. When a connection is established with the game server 12, the one or more executed actions may be verified.

The game server 12 may be configured to execute one or more computer program modules. The computer program modules may include one or more of a user module 18, a space module 20, an interaction module 22, a relationship module 24, a network module 26, a verification module 28, and/or other modules.

The user module 18 may be configured to access and/or manage one or more user profiles and/or user information associated with users of the system 10. The one or more user profiles and/or user information may include information stored by game server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

Space module 20 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space.

Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 20. Expressions of the instance executed on the clients may include space logic that effectively provides for execution of a limited version of the instance on a client that is synchronized and/or verified with state information received from space module 20. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 20 is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via respective client computing platforms 14. Communications may be routed to and from the appropriate users through game server 12 (e.g., through space module 20).

The interaction module 22 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 22 in monitoring the interactions of the users may be stored to the user profiles managed by user module 18.

At a given time, interaction module 22 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module 22 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The relationship module 24 may be configured to establish relationships between users within the virtual space. Such relationships may include one or more of friendships, guilds (with guild-mates), alliances, connections, followers, and/or other relationships. The relationship module 24 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships of a social construct within the virtual space that does not have a functional result.

Network module 26 of the game server 12 may be configured to maintain a connection to the one or more client computing platforms 14. For example, the network module 26 may maintain one or more communication lines or ports to enable connection and/or exchange of information with a network 44 and/or other computing platforms 14. Information such as state information, game state and game logic may be communicated via network module 26. The network module may be configured to receive information from the client computing platform 14 as well.

Verification module 26 of the game server 12 may be configured to receive one or more executed actions from the one or more client computing platforms 14 when the client computing platforms 14 establish a connection with the game server 12. For example, the verification module 28 may receive information related to a first executed action from a client computing platform 14.

In some implementations, the verification module 28 may determine whether the first executed action may be verified. For example, the verification module 28 may determine whether the action could have occurred based on the game state and/or game logic of the online game.

In some implementations, the verification module 28 may determine whether the one or more executed actions affect one or more virtual entities associated with users other than the user that executed the first action. When the first executed action affects only the one or more virtual entities associated with the user that executed the first action, the verification module 28 may determine whether the first executed action could have occurred based on the game state. For example, the first executed action may be purchase of a virtual item, sending a request for a relationship to one or more entities associated with another user, changing locations in the virtual space, changing an avatar of the user, and/or other actions that affect only the user that executed the first action. In some implementations, the verification module 28 may determine whether the first executed action could have occurred based on the game state and game logic.

When the one or more executed actions affect one or more virtual entities associated with users other than the user that executed the first action, the verification module may determine whether the one or more executed actions could have occurred based on the information in the game state associated with the affected sets of one or more virtual entities. The verification module 28 may check the game state and game logic to determine if the first executed action may be verified. For example, the verification module 28 may perform a trial execution of the first executed action to determine whether a result of the first executed action would be identical if it were executed using the game state and game logic stored at the server. During the trial execution, the game state may not be changed.

When the results of the first executed action and the trial execution are identical, the verification module 28 may verify the first executed action as valid. When the results are not identical, the verification module 28 may find the first executed action to be invalid. For example, the first executed action of the user may comprise an attack and/or defeat of the city of a second user based on game state and game logic stored at the client computing platform 14 when the client computing platform 14 was offline and not connected to the game server 12. If the second user increased security when the client computing platform 14 was offline, the first executed action would be determined to be not valid because a result of the first executed action may be different.

In some implementations, the game logic used to determine whether the first executed action and the trial execution are identical may be different from the game logic stored at the client computing platform 14 when the client computing platform 14 was offline. In some implementations, when the results of the first executed action and the trial execution are identical, but the game logic on the game server 12 and the game logic that had been stored at the client computing platform 14 are different, the first executed action may be determined to be invalid.

Responsive to the determination of whether the action could occur, the verification module 28 may generate verification information. The verification information may comprise an indication that the first executed action is not valid, and/or other information related to the verification of the first executed action. In some implementations, when the first executed action has been determined to be valid, the verification information may also comprise a request for confirmation of the first executed action. For example, the verification information may comprise a request for confirmation when the first executed action comprises a purchase of virtual items, a change of avatar, and/or other action that involves only one or more virtual entities of the user that executed the first action.

In some implementations, the verification module 28 may send an updated game state and/or updated game logic of the online game responsive to receiving the executed action. In these implementations, the verification module 44 of the client computing platform 14 may perform verification the same or similar to that performed by the verification module 28 of the game server 12. The types of executed actions, and the verification of the executed actions, will be discussed in further detail with regard to the client computing platforms 14.

In some implementations, when the first executed action has been determined to valid (or the game server 12 requested and received confirmation of the first executed action), the game server 12 will execute the first executed action and update the game state and/or game logic of the online game based on the execution of the first executed action.

The client computing platform 14 may be configured to provide offline asynchronous user activity in the player versus player online game and may be associated with a first user. The client computing platform may comprise a game state repository 32, a game logic repository 34, a processor 38 configured to execute compute program modules, and/or other components. The program modules may comprise a network module 40, an offline play module 42, a verification module 44, and/or other modules.

The game state repository 32 of the client computing platform may be configured to store a game state of the game space. The game state may include information related to a first set of one or more virtual entities in the game space associated with the first user, information related to a second set of one or more virtual entities in the game space associated with a second user, and/or information related to another set of one or more virtual entities in the game space associated with another user.

The game logic repository 34 may be configured to store game logic for the online game. In some implementations, the game logic may comprise a decision tree comprising one or more of: information relating to a plurality of actions available to the first user based on the game state, information relating to a plurality of consequences associated with the plurality of respective actions available and based on the game state, or a plurality of requirements associated with the plurality of respective actions and based on the game state.

The network module 40 of the client computing platform 14 may be configured to maintain a connection to the game server 12. The game server 12 may host a game space in which the online game takes place. The network module 40 may be configured to receive a game state from the game server 12. The network module 40 may be configured to receive game logic from the game server 12. The game state and/or the game logic may be received from the game server at predetermined time intervals, where the predetermined time intervals may be set by the game, set by the user, set by administrators of the game, and/or set in other ways. The network module 40 may be configured to communicate information from the client computing platform 14 to the game server 12 as well.

The offline play module 42 may be configured to store, at the game state repository 32, a game state received from the game server 12 and store, at the game logic repository 34, game logic received from the game server 12. Responsive to the client computing platform 14 disconnecting from the game server 12, the offline play module 42 may be configured to maintain an expression of the game space in an offline mode at the client computing platform 14 to facilitate continued participation by the first user in the online game while the client computing platform 14 is disconnected from the game server 12.

In some implementations, the offline play module 42 may be configured to receive instructions from the first user via the client computing platform 14 for one or more actions to be taken by the first set of virtual entities in the game space. The one or more actions may cause the first set of virtual entities to interact with the game space. The offline play module 42 may be configured to execute the one or more actions in the online game based on the received instructions such that the first set of virtual entities interact with the game space stored in the games space repository 32, and such that an outcome of the one or more actions is dictated based on the game logic stored in the game logic repository 34. When a connection is re-established with the game server 12, the offline play module 42 may be configured to send the one or more actions to the game server 12.

In some implementations, an action may comprise a purchase of one or more virtual items, an interaction between the first set of virtual entities and the second set of virtual entities, and/or other action in the online game. An interaction between the first set of virtual entities and the second set of virtual entities may comprise one or more of: engaging in a battle with one or more of the second set of virtual entities, crossing into territory associated with one or more of the second set of virtual entities, joining an alliance with one or more of the second set of virtual entities, meeting with one or more of the second set of virtual entities, and/or other interaction between the first set of virtual entities and the second set of virtual entities.

The verification module 44 may be configured to verify the one or more executed actions. In some implementations, the verification module 44 may verify the one or more executed actions by sending the one or more executed actions to the game server 12, and receiving, from the game server 12, verification information related to a first executed action of the one or more actions. The verification information may comprise a request for confirmation of the first executed action, an indication that the first executed action is not valid, and/or other information related to the verification of the first executed action. The verification module 44 may communicate the verification information to the user via, for example, an interface of the client computing platform 14. When the verification information comprises a request for confirmation, the verification module 44 may be configured to receive a response from the user via, for example, an interface of the client computing platform 14. When the verification module 44 receives a response regarding confirmation, the verification module 44 may communicate that response to the game server 12.

In some implementations, the verification module 44 may verify the one or more executed actions by receiving, from the game server 12, an updated game state and/or updated game logic. In these implementations, the verification module 28 may determine whether the first executed action may be verified. For example, the verification module 28 may determine whether the action could have occurred based on the updated game state and/or updated game logic received from the game server 12.

In some implementations, the verification module 44 may determine whether the one or more executed actions affect one or more virtual entities associated with users other than the user that executed the first action. When the first executed action affects only the one or more virtual entities associated with the user that executed the first action, the verification module 44 may determine whether the first executed action could have occurred based on the updated game state. For example, the first executed action may be purchase of a virtual item, sending a request for a relationship to one or more entities associated with another user, changing locations in the virtual space, changing an avatar of the user, and/or other actions that affect only the user that executed the first action. In some implementations, the verification module 44 may determine whether the first executed action could have occurred based on the updated game state and updated game logic.

When the one or more executed actions affect one or more virtual entities associated with users other than the user that executed the first action, the verification module 44 may determine whether the one or more executed actions could have occurred based on the information in the updated game state associated with the affected sets of one or more virtual entities. The verification module 44 may check the updated game state and/or updated game logic to determine if the first executed action may be verified. For example, the verification module 44 may perform a trial execution of the first executed action to determine whether a result of the first executed action would be identical if it were executed using the updated game state and updated game logic. During the trial execution, the game state stored at the client computing platform 14 may not be changed.

When the results of the first executed action and the trial execution are identical, the verification module 44 may verify the first executed action as valid. When the results are not identical, the verification module 44 may find the first executed action to be invalid. For example, the first executed action of the user may comprise an attack and/or defeat of the city of a second user based on game state and game logic stored at the client computing platform 14 when the client computing platform 14 was offline and not connected to the game server 12. If the second user increased security when the client computing platform 14 was offline, the first executed action would be determined to be not valid because a result of the first executed action may be different.

In some implementations, the updated game logic used to determine whether the first executed action and the trial execution are identical may be different from the game logic stored at the client computing platform 14 when the client computing platform 14 was offline. In some implementations, when the results of the first executed action and the trial execution are identical, but the updated game logic and the game logic that had been stored at the client computing platform 14 are different, the first executed action may be determined to be invalid.

Responsive to the determination of whether the action could occur, the verification module 44 may determine whether the first executed action was valid or invalid. In some implementations, the verification module 44 may communicate to the user whether the first executed action was valid or invalid via an interface of the client computing platform 14. In some implementations, when the verification module 44 determines that the first executed action is valid, the verification action 44 may communicate, via an interface of the client computing platform 14, a request for confirmation of the first executed action. For example, the verification module 44 may request confirmation when the first executed action comprises a purchase of virtual items, a change of avatar, and/or other action that involves only one or more virtual entities of the user that executed the first action.

The verification module 44 may communicate whether the first executed action was valid or invalid to the game server 12. When confirmation of the first executed action is requested, the verification module 44 may communicate to the game server 12 that confirmation was received and the response to the confirmation.

The game server 12, client computing platforms 14, and/or external resources may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game servers 12, client computing platforms 14, and/or external resources may be operatively linked via some other communication media.

Game server 12 may include electronic storage 30, one or more processors 16, and/or other components. Game server 12 may include communication lines, or ports to enable the exchange of information with a network 46 and/or other computing platforms 14. Illustration of game server 12 in FIG. 1 is not intended to be limiting. Game server 12 may include a plurality of hardware, software, and/or firmware components operating together to provide the functionality attributed herein to game server 12. For example, game server 12 may be implemented by a cloud of computing platforms operating together as game server 12.

Electronic storage 30 may comprise non-transitory storage media that electronically stores information. The electronic storage media of electronic storage 30 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may include one or more virtual storage resources (e.g., cloud storage, a virtual private network, and/or other virtual storage resources). Electronic storage 30 may store software algorithms, information determined by processor 16, information received from game server 12, information received from client computing platforms 14, and/or other information that enables game server 12 to function as described herein.

Processor(s) 16 is configured to provide information processing capabilities in game server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, 26 and 28. Processor 16 may be configured to execute modules 18, 20, 22, 24, 26 and 28 by software; hardware; firmware; some combination of software, hardware, and/or firmware; and/or other mechanisms for configuring processing capabilities on processor 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, 26 and 28 are illustrated in FIG. 1 as being implemented within a single processing unit, in implementations in which processor includes multiple processing units, one or more of modules 18, 20, 22, 24, 26 and 28 may be implemented remotely from the other modules. The description of the functionality provided by the different modules 18, 20, 22, 24, 26 and 28 described below is for illustrative purposes, and is not intended to be limiting, as any of modules 18, 20, 22, 24, 26 and 28 may provide more or less functionality than is described. For example, one or more of modules 18, 20, 22, 24, 26 and 28 may be eliminated, and some or all of its functionality may be provided by other ones of modules 18, 20, 22, 24, 26 and 28. As another example, processor 16 may be configured to execute one or more additional modules that may perform some or all of the functionality attributed below to one of modules 18, 20, 22, 24, 26 and 28.

A given client computing platform 14 may include one or more processors configured to execute computer program modules. The computer program modules may be configured to enable an expert or user associated with the given client computing platform 14 to interface with system 10, game server 12, and/or external resources, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Game state repository 32 may comprise non-transitory storage media that electronically stores information. The electronic storage media of game state repository 32 may include one or both of system storage that is provided integrally (i.e., substantially non-removable) with client computing platform 14 and/or removable storage that is removably connectable to client computing platform 14 via, for example, a port (e.g., a USB port, a firewire port, etc.) or a drive (e.g., a disk drive, etc.). Game state repository 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Game state repository 32 may include one or more virtual storage resources (e.g., cloud storage, a virtual private network, and/or other virtual storage resources). Game state repository 32 may store software algorithms, information determined by processor 38, information received from game server 12, information received from other client computing platforms 14, and/or other information that enables client computing platform 14 to function as described herein.

Game logic repository 34 may comprise non-transitory storage media that electronically stores information. The electronic storage media of game logic repository 34 may include one or both of system storage that is provided integrally (i.e., substantially non-removable) with client computing platform 14 and/or removable storage that is removably connectable to client computing platform 14 via, for example, a port (e.g., a USB port, a firewire port, etc.) or a drive (e.g., a disk drive, etc.). Game logic repository 34 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Game logic repository 34 may include one or more virtual storage resources (e.g., cloud storage, a virtual private network, and/or other virtual storage resources). Game logic repository 34 may store software algorithms, information determined by processor 38, information received from game server 12, information received from other client computing platforms 14, and/or other information that enables client computing platform 14 to function as described herein.

Electronic storage 36 may comprise non-transitory storage media that electronically stores information. The electronic storage media of electronic storage 36 may include one or both of system storage that is provided integrally (i.e., substantially non-removable) with client computing platform 14 and/or removable storage that is removably connectable to client computing platform 14 via, for example, a port (e.g., a USB port, a firewire port, etc.) or a drive (e.g., a disk drive, etc.). Electronic storage 36 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 36 may include one or more virtual storage resources (e.g., cloud storage, a virtual private network, and/or other virtual storage resources). Electronic storage 36 may store software algorithms, information determined by processor 38, information received from game server 12, information received from other client computing platforms 14, and/or other information that enables client computing platform 14 to function as described herein.

In some implementations, electronic storage 36 may comprise one or more of game state repository 32, game logic repository 34, and/or other repositories. In some implementations, game state repository 32 and game logic repository 34 may reside in a single storage media. Other implementations of game state repository 32, game logic repository 34, and electronic storage 36 may be used as well.

Processor(s) 38 is configured to provide information processing capabilities in client computing platform 14. As such, processor 38 may include one or more of a digital processor, an analog processor, a digital circuit designed to process information, an analog circuit designed to process information, a state machine, and/or other mechanisms for electronically processing information. Although processor 38 is shown in FIG. 1 as a single entity, this is for illustrative purposes only. In some implementations, processor 38 may include a plurality of processing units. These processing units may be physically located within the same device, or processor 38 may represent processing functionality of a plurality of devices operating in coordination. The processor 38 may be configured to execute modules 40, 42, and 44. Processor 38 may be configured to execute modules 40, 42, and 44 by software; hardware; firmware; some combination of software, hardware, and/or firmware; and/or other mechanisms for configuring processing capabilities on processor 38. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 40, 42, and 44 are illustrated in FIG. 1 as being implemented within a single processing unit, in implementations in which processor includes multiple processing units, one or more of modules 40, 42, and 44 may be implemented remotely from the other modules. The description of the functionality provided by the different modules 40, 42, and 44 described below is for illustrative purposes, and is not intended to be limiting, as any of modules 40, 42, and 44 may provide more or less functionality than is described. For example, one or more of modules 40, 42, and 44 may be eliminated, and some or all of its functionality may be provided by other ones of modules 40, 42, and 44. As another example, processor 38 may be configured to execute one or more additional modules that may perform some or all of the functionality attributed below to one of modules 40, 42, and 44

FIG. 2 illustrates a method 48 of providing offline asynchronous user activity beyond the playing of a discrete game in a player versus player online game. The operations of method 48 presented below are intended to be illustrative. In some embodiments, method 48 may be accomplished with one or more additional operations not described, and/or without one or more of the operations discussed. Additionally, the order in which the operations of method 48 are illustrated in FIG. 2 and described below is not intended to be limiting.

In some embodiments, method 48 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 48 in response to instructions stored electronically on an electronic storage medium. The one or more processing devices may include one or more devices configured through hardware, firmware, and/or software to be specifically designed for execution of one or more of the operations of method 48.

At an operation 50, the client computing platform 14 may maintain a connection to the game server 12. The game server 12 may host a game space in which the online game takes place. In some implementations, operation 50 may be performed by a network module the same as or similar to network module 44 (shown in FIG. 1 and described above).

In an operation 52, the client computing platform 14 may store, at the game state repository 32 on the client computing platform 14, a game state of the game space from the game server 12. In some implementations, operation 52 may be performed by a network module the same as or similar to network module 44 (shown in FIG. 1 and described above).

In an operation 54, the client computing platform 14 may store, at the game logic repository 34 on the client computing platform 14, a game logic for the online game from the game server 12. In some implementations, operation 54 may be performed by a network module the same as or similar to network module 44 (shown in FIG. 1 and described above).

In an operation 56, the client computing platform 14 may disconnect from the game server 12. In some implementations, operation 56 may be performed by a network module the same as or similar to network module 44 (shown in FIG. 1 and described above).

In an operation 58, responsive to disconnecting from the game server 12, the client computing platform 14 may maintain an expression of the game space in an offline mode at the client computing platform 14 to facilitate continued participation by the first user in the online game while the client computing platform 14 is disconnected from the game server 12. In some implementations, operation 58 may be performed by a network module the same as or similar to offline play module 42 (shown in FIG. 1 and described above).

In an operation 60, the client computing platform 14 may receive instructions from the first user via the client computing platform 14 for one or more actions to be taken by the first set of virtual entities in the game space, wherein the one or more actions cause the first set of virtual entities to interact with the second set of virtual entities. In some implementations, operation 50 may be performed by a network module the same as or similar to offline play module 42 (shown in FIG. 1 and described above).

In an operation 62, the client computing platform 14 may execute the one or more actions in the online game based on the received instructions such that the first set of virtual entities interact with the second set of virtual entities, and such that an outcome of the one or more actions is dictated based on the game logic. In some implementations, operation 50 may be performed by a network module the same as or similar to offline play module 42 (shown in FIG. 1 and described above).

In an operation 64, the client computing platform 14 may establish a connection with the game server 12. In some implementations, operation 64 may be performed by a network module the same as or similar to network module 44 (shown in FIG. 1 and described above).

In an operation 66, the client computing platform 14 may verify the one or more executed actions. In some implementations, operation 66 may be performed by a network module the same as or similar to verification module 48 (shown in FIG. 1 and described above).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of providing offline asynchronous user activity in a player versus player online game, the method comprising:
   maintaining, by a client computing platform, a connection to a game server, the client computing platform being associated with a first user;
   storing, at a game state repository on the client computing platform, a game state of the game space, the game state including information related to a first set of one or more virtual entities in the game space associated with the first user and information related to a second set of one or more virtual entities in the game space associated with a second user;
   storing, at a game logic repository on the client computing platform, game logic for the online game, the game logic being based on the game state;
   disconnecting, by the client computing platform, from the game server;
   responsive to disconnecting from the game server:
      maintaining, by the client computing platform, an expression of the game space in an offline mode at the client computing platform to facilitate continued participation by the first user in the online game while the client computing platform is disconnected from the game server;
      receiving instructions from the first user via the client computing platform for one or more actions to be taken by the first set of virtual entities in the game space, wherein the one or more actions cause the first set of virtual entities to interact with the game space; and
      executing, by the client computing platform, the one or more actions in the online game based on the received instructions such that the first set of virtual entities interact with the game space, and such that an outcome of the one or more actions is dictated based on the game logic;
   establishing a connection, by the client computing platform, with the game server; and
   verifying, by the client computing platform, the one or more executed actions, wherein verifying the one or more executed actions comprises:
      sending the one or more executed actions to the game server; and
      receiving, from the game server, information related to a first executed action of the one or more actions.

2. The method of claim 1, wherein the information comprises a request for confirmation of the first executed action.

3. The method of claim 1, wherein the information comprises an indication that the first executed action is not valid.

4. The method of claim 1, further comprising:
   wherein verifying the one or more executed actions comprises:
      receiving information, from the game server, indicating whether the one or more executed actions effects the second set of one or more virtual entities and indicating whether the one or more executed actions could have occurred based on the information in the game state associated with the first set of one or more virtual entities and/or the second set of one or more virtual entities.

5. The method of claim 1, wherein an action comprises one or more of: a purchase one or more virtual items or an interaction between the first set of virtual entities and the second set of virtual entities.

6. The method of claim 5, wherein an interaction between the first set of virtual entities and the second set of virtual entities comprises one or more of:
   engaging in a battle with one or more of the second set of virtual entities, crossing into territory associated with one or more of the second set of virtual entities, joining an alliance with one or more of the second set of virtual entities, or meeting with one or more of the second set of virtual entities.

7. The method of claim 1, wherein the game logic comprises a decision tree comprising one or more of: information relating to a plurality of actions available to the first user based on the game state, information relating to a plurality of consequences associated with the plurality of respective actions available and based on the game state, or a plurality of requirements associated with the plurality of respective actions and based on the game state.

8. A client computing device configured to provide offline asynchronous user activity in a player versus player online game, the device comprising:
   a game state repository configured to store a game state of the game space, the game state including information related to a first set of one or more virtual entities in the game space associated with the first user and information related to a second set of one or more virtual entities in the game space associated with a second user;
   a game logic repository configured to store game logic for the online game, the game logic being based on the game state; and
   one or more processors configured by machine-readable instructions to:
   maintain a connection to a game server, the client computing platform being associated with the first user;
   store, at the game state repository, a game state received from the game server;
   store, at the game logic repository, game logic received from the game server;
   disconnect from the game server;
   responsive to disconnecting from the game server:
   maintain an expression of the game space in an offline mode at the client computing platform to facilitate continued participation by the first user in the online game while the client computing platform is disconnected from the game server;
   receive instructions from the first user via the client computing platform for one or more actions to be taken by the first set of virtual entities in the game space, wherein the one or more actions cause the first set of virtual entities to interact with the game space; and
   execute the one or more actions in the online game based on the received instructions such that the first set of virtual entities interact with the game space, and such that an outcome of the one or more actions is dictated based on the game logic; and
   establish a connection with the game server; and
      verify the one or more executed actions, wherein verifying the one or more executed actions comprises:
         sending the one or more executed actions to the game server; and
         receiving, from the game server, information related to a first executed action of the one or more actions.

9. The device of claim 8, wherein the information comprises a request for confirmation of the first executed action.

10. The device of claim 8, wherein the information comprises an indication that the first executed action is not valid.

11. The device of claim 8, wherein the one or more processors are configured by machine-readable instructions to verify the one or more executed actions by:
transmitting an updated game state to the game server;
receiving information indicating whether the one or more executed actions effects the second set of one or more virtual entities;
when the one or more executed actions effects the second set of one or more virtual entities, receiving information indicating whether the one or more executed actions could have occurred based on the information in the updated game state associated with the first set of one or more virtual entities and/or the second set of one or more virtual entities.

12. The device of claim 8, wherein an action comprises one or more of: a purchase one or more virtual items or an interaction between the first set of virtual entities and the second set of virtual entities.

13. The device of claim 12, wherein an interaction between the first set of virtual entities and the second set of virtual entities comprises one or more of:
engaging in a battle with one or more of the second set of virtual entities, crossing into territory associated with one or more of the second set of virtual entities, joining an alliance with one or more of the second set of virtual entities, or meeting with one or more of the second set of virtual entities.

14. The device of claim 8, wherein the game logic comprises a decision tree comprising one or more of: information relating to a plurality of actions available to the first user based on the game state, information relating to a plurality of consequences associated with the plurality of respective actions available and based on the game state, or a plurality of requirements associated with the plurality of respective actions and based on the game state.

15. A non-transitory electronic storage media storing information related to providing offline asynchronous user activity in a player versus player online game, the stored information comprising:
a memory configured to store information related to the one or more players of an online game;
a game state repository configured to store a game state of the game space, the game state including information related to a first set of one or more virtual entities in the game space associated with a first user and information related to a second set of one or more virtual entities in the game space associated with a second user;
a game logic repository configured to store game logic for the online game, the game logic being based on the game state; and
instructions configured to cause a client computing platform to:
maintain a connection to a game server, the client computing platform being associated with a first user;
store at the game state repository on the client computing platform, a game state of the game space;
store, at a game logic repository on the client computing platform, game logic for the online game;
disconnect, by the client computing platform, from the game server;
responsive to disconnecting from the game server:
maintain an expression of the game space in an offline mode at the client computing platform to facilitate continued participation by the first user in the online game while the client computing platform is disconnected from the game server;
receive instructions from the first user via the client computing platform for one or more actions to be taken by the first set of virtual entities in the game space, wherein the one or more actions cause the first set of virtual entities to interact with the game space; and
execute the one or more actions in the online game based on the received instructions such that the first set of virtual entities interact with the game space, and such that an outcome of the one or more actions is dictated based on the game logic;
establish a connection, by the client computing platform, with the game server; and
verify the one or more executed actions, wherein verifying the one or more executed actions comprises:
sending the one or more executed actions to the game server; and
receiving, from the game server, information related to a first executed action of the one or more actions.

* * * * *